United States Patent
Shimizu

(10) Patent No.: US 11,242,918 B2
(45) Date of Patent: Feb. 8, 2022

(54) ELECTRIC ACTUATOR

(71) Applicant: NTN CORPORATION, Osaka (JP)

(72) Inventor: Tatsunori Shimizu, Shizuoka (JP)

(73) Assignee: NTN CORPORATION, Osaka (JP)

( * ) Notice: Subject to any disclaimer, the term of this patent is extended or adjusted under 35 U.S.C. 154(b) by 140 days.

(21) Appl. No.: 16/343,041

(22) PCT Filed: Oct. 24, 2017

(86) PCT No.: PCT/JP2017/038351
§ 371 (c)(1),
(2) Date: Apr. 18, 2019

(87) PCT Pub. No.: WO2018/079544
PCT Pub. Date: May 3, 2018

(65) Prior Publication Data
US 2020/0049241 A1   Feb. 13, 2020

(30) Foreign Application Priority Data

Oct. 31, 2016   (JP) .............................. JP2016-213141

(51) Int. Cl.
*H02K 5/10*   (2006.01)
*F16H 25/22*   (2006.01)
(Continued)

(52) U.S. Cl.
CPC ......... *F16H 25/2204* (2013.01); *F16H 25/24* (2013.01); *H02K 5/10* (2013.01);
(Continued)

(58) Field of Classification Search
CPC ........ H02K 5/10; F16J 3/042; B60B 27/0073; F16H 2025/2031
See application file for complete search history.

(56) References Cited

U.S. PATENT DOCUMENTS 6,047,546 A * 4/2000 Takeyama ............. B60T 13/745
  60/533
7,192,214 B2 * 3/2007 Schonhoff ........... F16C 11/0671
  403/122
(Continued)

FOREIGN PATENT DOCUMENTS

CN   101784808   7/2010
EP   3 045 774   7/2016
(Continued)

OTHER PUBLICATIONS

International Search Report dated Dec. 19, 2017 in International (PCT) Application No. PCT/JP2017/038351.
(Continued)

*Primary Examiner* — Jake Cook
*Assistant Examiner* — Gregory Robert Weber
(74) *Attorney, Agent, or Firm* — Wenderoth, Lind & Ponack, L.L.P.

(57) ABSTRACT

Provided is an electric actuator, including: a driving motor (2); a motion conversion mechanism (6) configured to convert a rotary motion of the driving motor (2) to a linear motion; a boot (27) configured to prevent entry of a foreign substance into the motion conversion mechanism (6); and a boot cover (31) arranged so as to cover an outer side of the boot (27), wherein the boot cover (31) is formed integrally with an exterior case (8) of the electric actuator, and wherein a boot mounting member (30) having the boot (27) mounted thereto is mounted to an inner side of the boot cover (31).

5 Claims, 9 Drawing Sheets

(51) Int. Cl.
    *F16H 25/24* (2006.01)
    *H02K 7/06* (2006.01)
    *H02K 7/116* (2006.01)
    *F16H 25/20* (2006.01)

(52) U.S. Cl.
    CPC .............. *H02K 7/06* (2013.01); *H02K 7/116* (2013.01); *F16H 2025/2031* (2013.01); *F16H 2025/2081* (2013.01); *F16H 2025/2087* (2013.01)

(56) References Cited

U.S. PATENT DOCUMENTS

| | | | |
|---|---|---|---|
| 10,302,161 B2* | 5/2019 | Roberts | F16D 55/22655 |
| 2005/0082908 A1* | 4/2005 | Klode | B60T 13/02 |
| | | | 303/20 |
| 2008/0157612 A1 | 7/2008 | Suyama et al. | |
| 2010/0230907 A1* | 9/2010 | Hatano | F16J 3/043 |
| | | | 277/634 |
| 2011/0271793 A1 | 11/2011 | Hatano | |
| 2012/0227524 A1* | 9/2012 | Takahashi | H02K 11/215 |
| | | | 74/89.34 |
| 2016/0201777 A1* | 7/2016 | Yamasaki | F16H 25/2252 |
| | | | 188/72.1 |
| 2019/0101213 A1* | 4/2019 | Walser | F16J 15/3264 |

FOREIGN PATENT DOCUMENTS

| | | |
|---|---|---|
| JP | 10-201173 | 7/1998 |
| JP | 2008-164014 | 7/2008 |
| JP | 2016-044739 | 4/2016 |
| JP | 2016-70324 | 5/2016 |
| WO | 2010/134125 | 11/2010 |
| WO | 2016/052477 | 4/2016 |

OTHER PUBLICATIONS

Notice of Reasons for Refusal dated Sep. 11, 2020 in corresponding Japanese Patent Application No. 2016-213141 with English-language translation.
International Preliminary Report on Patentability and Written Opinion of the International Searching Authority dated Apr. 30, 2019 in International (PCT) Application No. PCT/JP2017/038351.
Extended European Search Report dated Jun. 3, 2020 in corresponding European Patent Application No. 17865964.5.
Chinese Office Action dated Mar. 11, 2021 in counterpart Chinese Patent Application No. 201780067470.1 with English translation of Search Report.

* cited by examiner

ELECTRIC ACTUATOR

TECHNICAL FIELD

The present invention relates to an electric actuator.

BACKGROUND ART

In recent years, electrification of automobiles and the like has been promoted for power saving and reduction in fuel consumption. For example, a system for operating an automatic transmission, a brake, a steering wheel, and the like of the automobile with use of power of an electric motor has been developed and brought to the market. As an electric actuator for use in such an application, there has been known an electric linear actuator configured to convert a rotary motion of a motor into a motion in a linear direction.

For example, in Patent Literature 1, there is proposed an actuator in which a boot configured to prevent entry of water, powder dust, and the like is mounted between a shaft configured to linearly move and a boss configured to support the shaft, and in which a boot cover configured to protect the boot is further provided on an outer periphery of the boot.

CITATION LIST

Patent Literature 1: WO 2010/134125 A1

SUMMARY OF INVENTION

Technical Problem

With the configuration described in Patent Literature 1, the boot cover is formed independently of an exterior case of the actuator, and hence the boot cover can be mounted so as to cover an outer side of the boot after the boot is mounted between the shaft and the boss. In contrast, when the boot cover is formed integrally with the exterior case, the boot needs to be inserted into the boot cover for the mounting. Thus, a mounting operation is difficult, and a space required for the mounting operation needs to be secured between a boot mounting portion and the boot cover, which leads to a problem such as an increase in size of the electric actuator. For this reason, it is difficult to form the boot cover integrally with the exterior case of the actuator.

Therefore, it is an object of the present invention to provide an electric actuator comprising a boot that can easily be mounted in the boot cover even when a boot cover is formed integrally with an exterior case.

Solution to Problem

As a technical measure to attain the above-mentioned object, according to one embodiment of the present invention, there is provided an electric actuator, comprising: a driving motor; a motion conversion mechanism configured to convert a rotary motion of the driving motor to a linear motion; a boot configured to prevent entry of a foreign substance into the motion conversion mechanism; and a boot cover configured to cover an outer side of the boot, wherein the boot cover is formed integrally with an exterior case of the electric actuator, and wherein a boot mounting member having the boot mounted thereto is mounted to an inner side of the boot cover.

With such a configuration in which the boot mounting member is mountable to the inner side of the boot cover, even when the boot cover is formed integrally with the exterior case, the boot can easily be mounted. That is, the boot mounting member can be mounted in the boot cover after the boot is mounted to the boot mounting member. Therefore, the mounting operation for the boot does not need to be performed in a narrow work space in the boot cover, thereby being capable of easily mounting the boot. Moreover, the space required for the mounting operation for the boot does not need to be secured in the boot cover. Therefore, an outer diameter of the boot cover can thus be reduced, thereby being capable of also achieving downsizing of the electric actuator in a radial direction.

The present invention is applicable also to an electric actuator, wherein the motion conversion mechanism comprises a ball screw arranged on an axis parallel with an output shaft of the driving motor, and wherein the electric actuator further comprises a transmission gear mechanism configured to transmit a driving force from the driving motor to the ball screw.

Further, in an electric actuator with the exterior case comprising: a motor case configured to accommodate the driving motor; and an actuator case configured to support the transmission gear mechanism and the ball screw, the boot cover may be formed integrally with the motor case.

Further, it is desired that the boot mounting member comprise an engagement claw configured to elastically deform in a radial direction to engage with the boot cover when the engagement claw is inserted into the boot cover in an axial direction. With this configuration, the boot mounting member can easily be mounted to the boot cover by only inserting the boot mounting member into the boot cover in the axial direction.

Moreover, the boot may be integrally joined to the boot mounting member. In this case, a boot band configured to mount the boot to the boot mounting member is no longer required. Therefore, the number of components decreases, thereby being capable of achieving cost reduction.

Advantageous Effects of Invention

According to the present invention, with the configuration in which the boot mounting member is mountable to the inner side of the boot cover, even when the boot cover is formed integrally with the exterior case, the boot can easily be mounted to the inner side of the boot cover, and downsizing of the electric actuator can also be achieved. According to the present invention, such problems as the difficulty in the boot mounting operation and the increase in size of the electric actuator when the boot cover is formed integrally with the exterior case can be solved in such a manner. Therefore, the boot cover can be formed integrally with the exterior case. As a result, the number of molds configured to form large components can be reduced, thereby being capable of achieving cost reduction.

DESCRIPTION OF EMBODIMENTS

Now, description is made of the present invention with reference to the accompanying drawings. In the respective drawings for illustrating the present invention, components such as members and component parts having the same functions or shapes are denoted by the same reference symbols as long as the components can be distinguished, and description thereof is therefore omitted after the description is made once.

Figure 1:
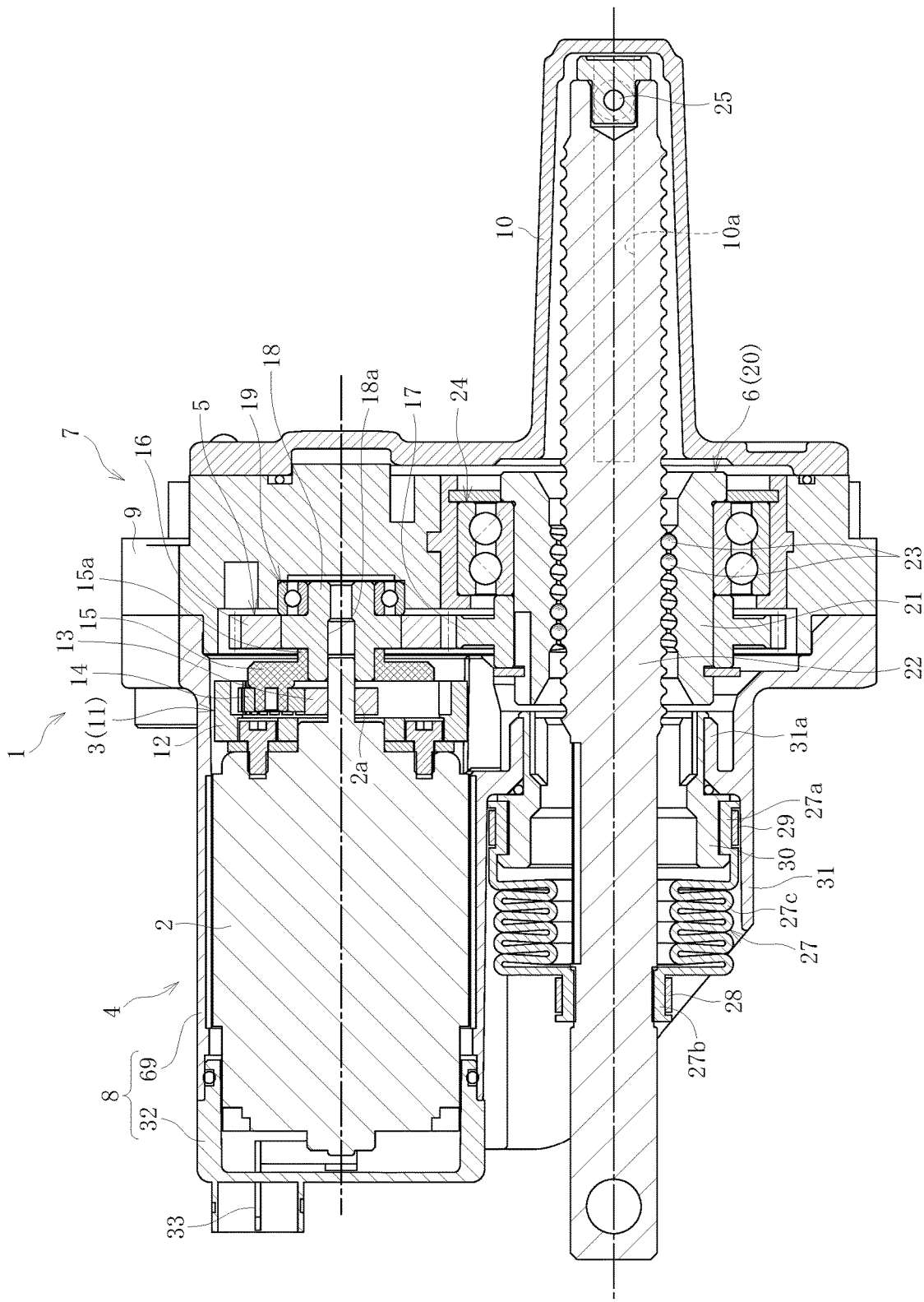
FIG. 1 is a vertical sectional view of an electric actuator according to one embodiment of the present invention.
Figure 2:
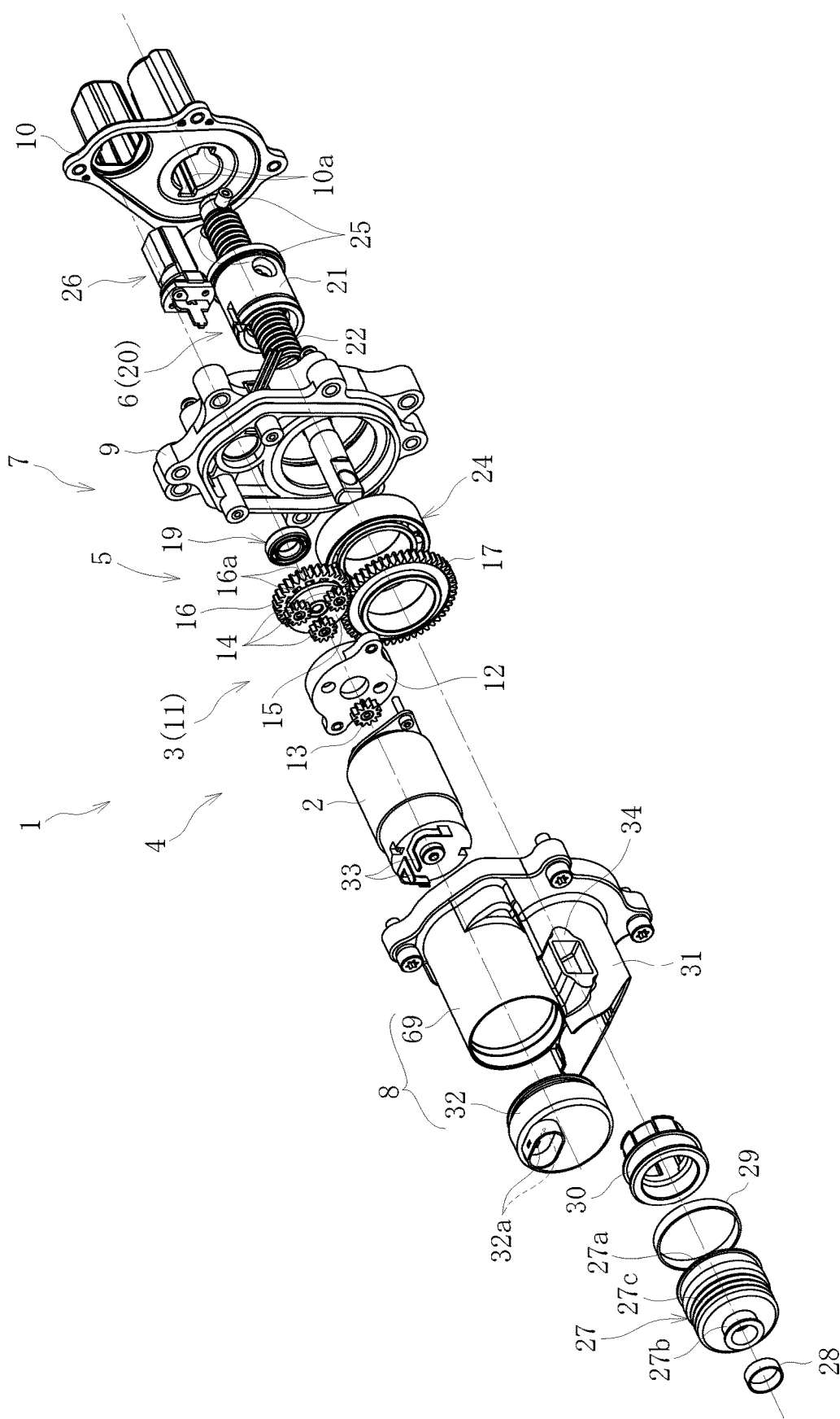
FIG. 2 is an exploded perspective view of the electric actuator.

FIG. 1 is a vertical sectional view of an electric actuator according to one embodiment of the present invention. FIG. 2 is an exploded perspective view of the electric actuator.

As illustrated in FIG. 1 and FIG. 2, the electric actuator 1 according to this embodiment mainly comprises a motor section 4 and a drive transmission/conversion section 7. The motor section 4 comprises a driving motor 2 and a speed reduction mechanism 3. The drive transmission/conversion section 7 comprises a transmission gear mechanism 5 and a motion conversion mechanism 6. As described later, it is not always required that the motor section 4 comprise the speed reduction mechanism 3.

The sections forming the electric actuator 1 comprise respective exterior cases. Components are accommodated or supported in the respective exterior cases. Specifically, the motor section 4 comprises a motor case 8 configured to accommodate the driving motor 2 and the speed reduction mechanism 3. The drive transmission/conversion section 7 comprises an actuator case 9 configured to support the transmission gear mechanism 5 and the motion conversion mechanism 6. Moreover, the motor case 8 comprises a motor-case main body 69 and a cap member 32. The motor-case main body 69 is configured to accommodate the driving motor 2. The cap member 32 is formed independently of the motor-case main body 69. The motor-case main body 69 is mounted to the actuator case 9 so as to be coupled and decoupled in an axial direction of the driving motor 2. The driving motor 2 and the speed reduction mechanism 3 are also mounted to the actuator case 9 so as to be coupled and decoupled in the axial direction. Further, a shaft case 10 configured to accommodate apart of the motion conversion mechanism 6 is mounted to the actuator case 9 on an opposite side of a motor case 8 side so as to be coupled and decoupled in the axial direction. These exterior cases are assembled to one another through fastening with bolts. Now, description is made of detailed configurations of the respective parts forming the electric actuator 1.

Figure 3:
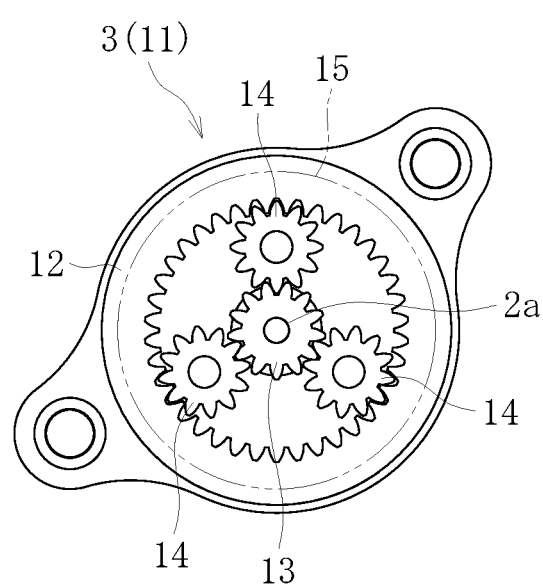
FIG. 3 is a view of a planetary-gear speed reduction mechanism as seen in an axial direction.

FIG. 3 is a view of the speed reduction mechanism as seen in the axial direction.

The speed reduction mechanism 3 comprises a planetary-gear speed reduction mechanism 11 formed of a plurality of gears and the like. As illustrated in FIG. 3, the planetary-gear speed reduction mechanism 11 is formed of a ring gear 12, a sun gear 13, a plurality of planetary gears 14, and a planetary gear carrier 15.

The sun gear 13 is arranged at the center of the ring gear 12. An output shaft 2a of the driving motor 2 is press-fitted to the sun gear 13. Moreover, the respective planetary gears 14 are arranged between the ring gear 12 and the sun gear 13 so as to mesh with the ring gear 12 and the sun gear 13. The respective planetary gears 14 are rotatably held by the planetary gear carrier 15.

In the planetary-gear speed reduction mechanism 11, when the driving motor 2 performs the rotational drive, the sun gear 13 coupled to the output shaft 2a of the driving motor 2 rotates, and, along with this rotation, the respective planetary gears 14 revolve along the ring gear 12 while rotating. Then, the planetary gear carrier 15 is rotated by the revolution motion of the planetary gears 14. With this, the speed of the rotation of the driving motor 2 is reduced, the rotation reduced in speed is transmitted, and a rotation torque increases. Through the transmission of the driving force via the planetary-gear speed reduction mechanism 11 in such a manner, a high output of the electric actuator 1 is thus obtained, and downsizing of the driving motor 2 can thus be achieved. In this embodiment, although an inexpensive (brush) DC motor is used as the driving motor 2, other motor such as a brushless motor may be used.

Next, as illustrated in FIG. 1 and FIG. 2, the transmission gear mechanism 5 is formed of a drive gear 16 and a driven gear 17. The drive gear 16 has a small diameter, and serves as a first gear with a rotation shaft arranged coaxially with the output shaft 2a of the driving motor 2. The driven gear 17 has a large diameter, and serves as a second gear which meshes with the drive gear 16. A gear boss 18 (see FIG. 1) serving as a rotation shaft is press-fitted to a rotation center portion of the drive gear 16. One end portion (right end portion in FIG. 1) of the gear boss 18 is rotatably supported by a rolling bearing 19 mounted to the actuator case 9. The drive gear 16 and the gear boss 18 may be integrally formed through sintering. Meanwhile, an end portion (left end portion in FIG. 1) of the gear boss on an opposite side is supported through insertion of the output shaft 2a of the driving motor 2 into a shaft hole 18a opened on a side of this end portion. That is, the output shaft 2a of the driving motor 2 is inserted into the gear boss 18 so as to constitute a relationship of a slide bearing rotatable relatively to the gear boss 18.

The gear boss 18 is so coupled to the planetary gear carrier 15 as to integrally rotate. In detail, the planetary gear carrier 15 has a cylindrical portion 15a (see FIG. 1) at a center portion thereof, and the cylindrical portion 15a is press-fitted over an outer peripheral surface of the gear boss 18. The planetary gear carrier 15 may be made of resin, and the gear boss 18 may be molded integrally with the planetary gear carrier 15 by insert molding. As a result, when the driving motor 2 performs rotary drive, and the planetary gear carrier 15 rotates accordingly, the drive gear 16 rotates integrally with the planetary gear carrier 15, and the driven gear 17 thus rotates. This embodiment is so configured that the rotation is reduced in speed (increased in torque) from the drive gear 16 having a small diameter to the driven gear 17 having a large diameter, but the rotation may be transmitted at a constant speed from the drive gear 16 to the driven gear 17.

Now, description is made of the motion conversion mechanism.

The motion conversion mechanism 6 is formed of a ball screw 20 arranged on an axis parallel with the output shaft 2a of the driving motor 2. The motion conversion mechanism 6 is not limited to the ball screw 20, and may be a lead screw device. However, in terms of reducing the rotation torque and downsizing the driving motor 2, the ball screw 20 is more preferred.

The ball screw 20 comprises a ball screw nut 21, a ball screw shaft 22, a large number of balls 23, and a circulation member (not shown). Spiral grooves are formed in each of an inner peripheral surface of the ball screw nut 21 and an outer peripheral surface of the ball screw shaft 22. Two rows of the balls 23 are received between both of the spiral grooves.

The ball screw nut 21 is rotatably supported by the double-row bearing 24 mounted to the actuator case 9. The double-row bearing 24 is fixed through press-fit on a rear end side (right side of FIG. 1) of the ball screw shaft 22 with respect to a portion on the outer peripheral surface of the ball screw nut 21 to which the driven gear 17 is fixed. Meanwhile, a rotation of the ball screw shaft 22 is restricted through insertion of a pin 25 serving as a rotation restriction member provided on a rear end portion (right end portion in FIG. 1) of the ball screw shaft 22 into guide grooves 10*a* in an axial direction formed in an inner peripheral surface of the shaft case 10.

When the ball screw nut 21 rotates, the plurality of balls 23 accordingly circulate through the circulation member while moving along the spiral grooves, and the ball screw shaft 22 advances/retreats along the guide grooves 10*a* of the shaft case 10. The rotary motion from the driving motor 2 is converted to a linear motion in the axial direction parallel with the output shaft 2*a* of the driving motor 2 through the advance/retreat of the ball screw shaft 22 in such a manner. A distal end portion (left end portion in FIG. 1) of the ball screw shaft 22 in the advance direction functions as an operation part (actuator head) configured to operate a device of an object to be operated. FIG. 1 is a view for illustrating a state in which the ball screw shaft 22 is arranged at an initial position when the ball screw shaft 22 retreats most toward the right side in FIG. 1.

Moreover, the electric actuator 1 according to this embodiment comprises a lock mechanism 26 (see FIG. 2) configured to prevent an unintended advance/retreat of the ball screw shaft 22. The lock mechanism 26 is mounted to the shaft case 10, and is configured to be capable of engaging with/disengaging from a plurality of engagement holes 16*a* (see FIG. 2) formed over the drive gear 16 in a circumferential direction. Even when an external force is input from a side of the object to be operated to a side of the ball screw shaft 22, an unintended advance/retreat of the ball screw shaft 22 is prevented, and a position of the ball screw shaft 22 in an advance/retreat direction can be maintained at a predetermined position by the lock mechanism 26 engaging with one of the engagement holes 16*a*, to thereby restrict the rotation of the drive gear 16. The configuration comprising such a lock mechanism 26 is particularly preferred for a case in which the electric actuator is applied to an application that requires maintenance of a position.

A boot 27 configured to prevent entry of foreign substances into the ball screw nut 21 is mounted on a distal end portion side of the ball screw shaft 22. The boot 27 is formed of a large-diameter end portion 27*a*, a small-diameter end portion 27*b*, and a bellows 27*c*. The bellows 27*c* is configured to connect the large-diameter end portion 27*a* and the small-diameter end portion 27*b* to each other, and extend/contract in the axial direction. The small-diameter end portion 27*b* is fixed to an outer peripheral surface of the ball screw shaft 22 through tightening a boot band 28. The large-diameter end portion 27*a* of the boot 27 is fixed to an outer peripheral surface of a boot mounting member 30 having a cylindrical shape mounted to the motor-case main body 69 through tightening a boot band 29.

Moreover, a boot cover 31 having a cylindrical shape configured to protect the boot 27 is provided on an outer side of the boot 27. A cylindrical mounting part 31*a* (see FIG. 1) is provided on an inner side of the boot cover 31. The boot mounting member 30 is mounted to the mounting part 31*a*. Both the boot cover 31 and the mounting part 31*a* are provided integrally with the motor-case main body 69.

Moreover, the cap member 32 is mounted to the motor-case main body 69 on an opposite side of an actuator case 9 side. An insertion hole 32*a* (see FIG. 2) configured to insert a bus bar 33 configured to supply power from a power source (not shown) to the driving motor 2 is formed in the cap member 32. Further, a sensor case 34 (see FIG. 2) configured to accommodate a stroke sensor configured to detect a stroke of the ball screw shaft 22 is provided integrally on the outer peripheral surface of the motor-case main body 69.

Figure 4:
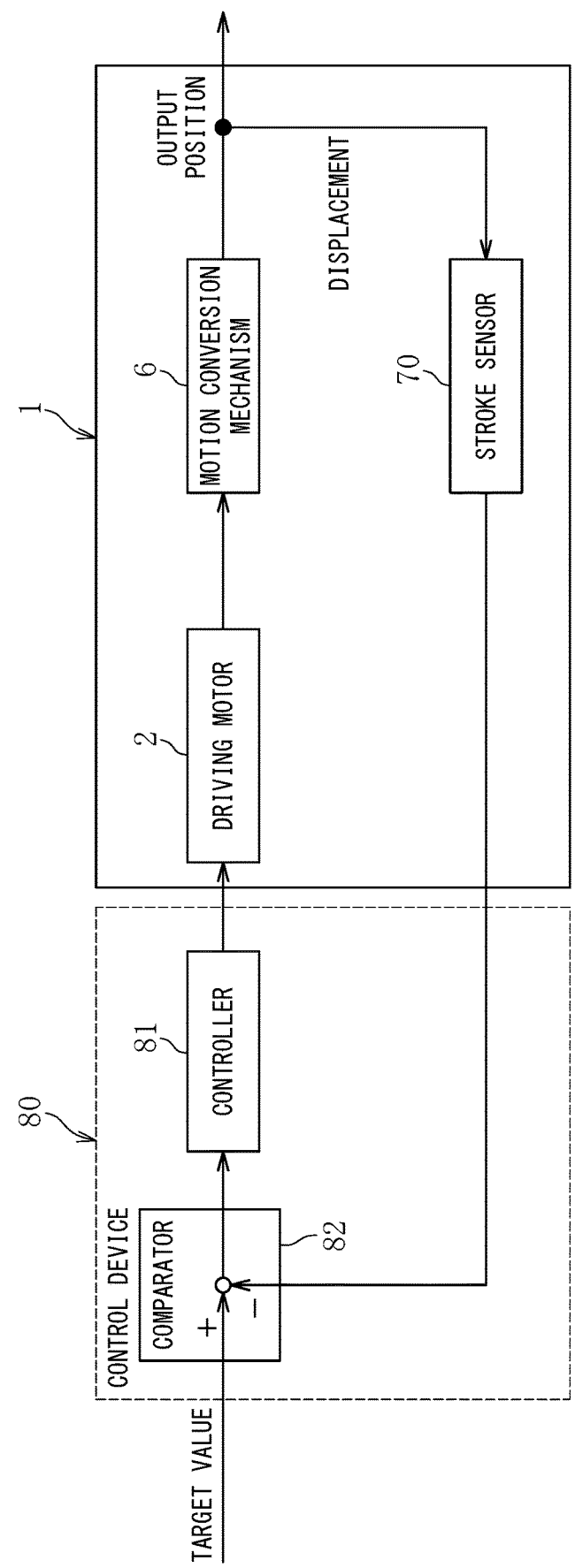
FIG. 4 is a control block diagram of the electric actuator.

Next, with reference to FIG. 4, description is made of feedback control for the electric actuator using the stroke sensor.

As illustrated in FIG. 4, when a target value is transmitted to a control device 80, a control signal is transmitted from a controller 81 of the control device 80 to the driving motor 2. The target value is, for example, a stroke value calculated by an ECU provided at an upper position of a vehicle based on an operation amount when the operation amount is input to the ECU.

When the driving motor 2 receives the control signal, the driving motor 2 starts the rotational drive, and the driving force thereof is transmitted to the ball screw shaft 22 through intermediation of the planetary-gear speed reduction mechanism 11, the drive gear 16, the driven gear 17, and the ball screw nut 21, and the ball screw shaft 22 thus advances. With this, the object device to be operated arranged on the distal end portion side (actuator head side) of the ball screw shaft 22 is operated.

At this time, the stroke value (position in the axial direction) of the ball screw shaft 22 is detected by the stroke sensor 70. The detection value detected by the stroke sensor 70 is transmitted to a comparison portion 82 of the control device 80, and a difference between the detection value and the target value is calculated. Then, the driving motor 2 is driven until the detection value matches the target value. When the electric actuator 1 of this embodiment is applied to, for example, a shift-by-wire system, a shift position can reliably be controlled by feeding back the stroke value detected by the stroke sensor 70 to control the position of the ball screw shaft 22 in such a manner.

Figure 5:
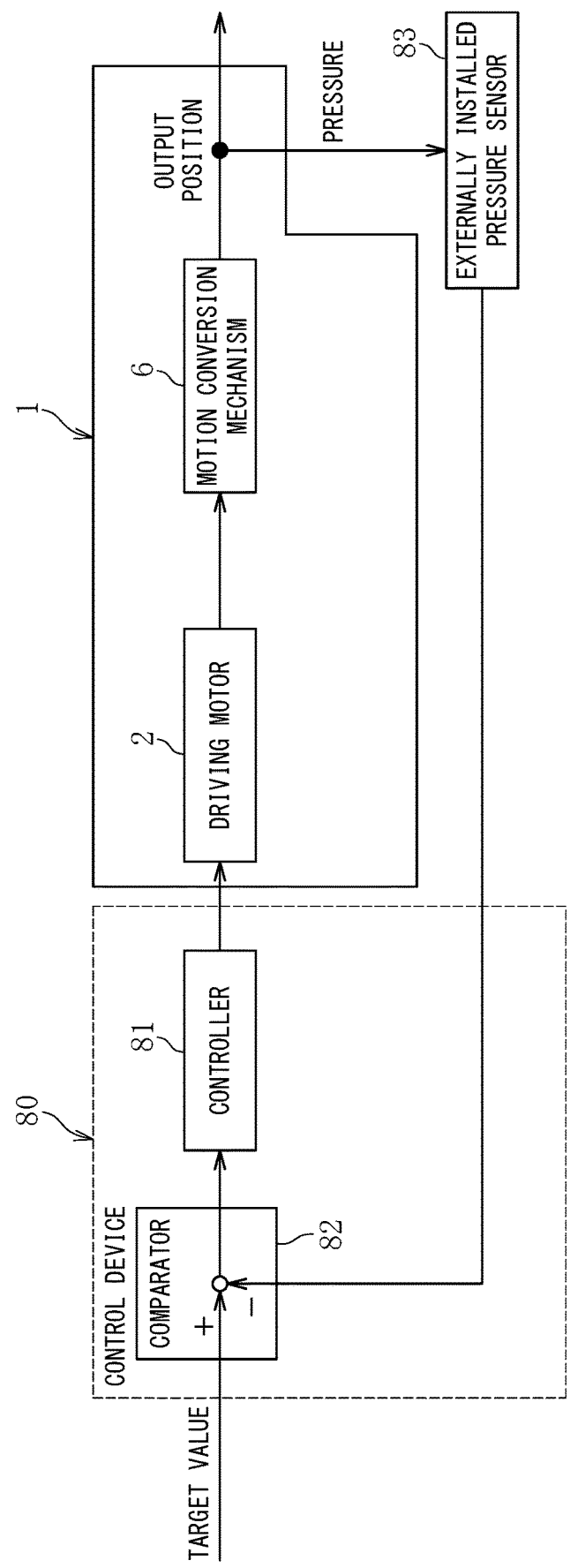
FIG. 5 is a control block diagram of the electric actuator.

Next, with reference to FIG. 5, description is made of feedback control in a case in which a pressure sensor 83 is used in place of the stroke sensor 70.

As illustrated in FIG. 5, in this case, the pressure sensor 83 is provided for the object device to be operated. When the operation amount is input to the ECU provided at the upper position of the vehicle, the ECU calculates a required target value (pressure command value). When the target value is transmitted to the control device 80, and the control signal is transmitted from the controller 81 to the driving motor 2, the driving motor 2 starts the rotational drive. With this, the ball screw shaft 22 advances, and the object device to be operated arranged on the distal end portion side (actuator head side) of the ball screw shaft 22 is operated to pressurize.

An operation pressure of the ball screw shaft 22 at this time is detected by the pressure sensor 83, and the position of the ball screw shaft 22 is subjected to the feedback control based on the detection value and the target value as in the case of the use of the stroke sensor 70. When the electric actuator 1 of this embodiment is applied to, for example, a brake-by-wire system, a hydraulic pressure of a brake can reliably be controlled by feeding back the pressure value detected by the pressure sensor 83 to control the position of the ball screw shaft 22 in such a manner.

The overall configuration and the operation of the electric actuator 1 according to this embodiment are as described above. Now, detailed description is made of a mounting structure for the boot 27 relating to the electric actuator 1 of this embodiment.

Figure 6:
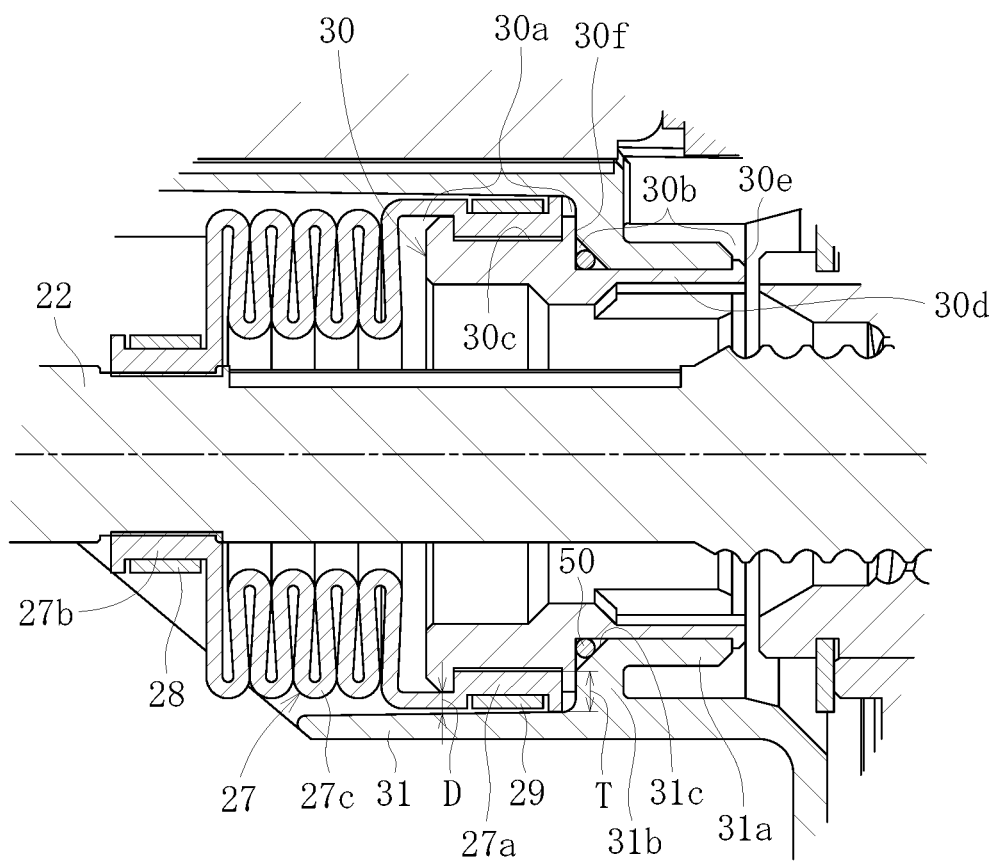
FIG. 6 is a sectional view for illustrating a mounting portion of a boot.
Figure 7:
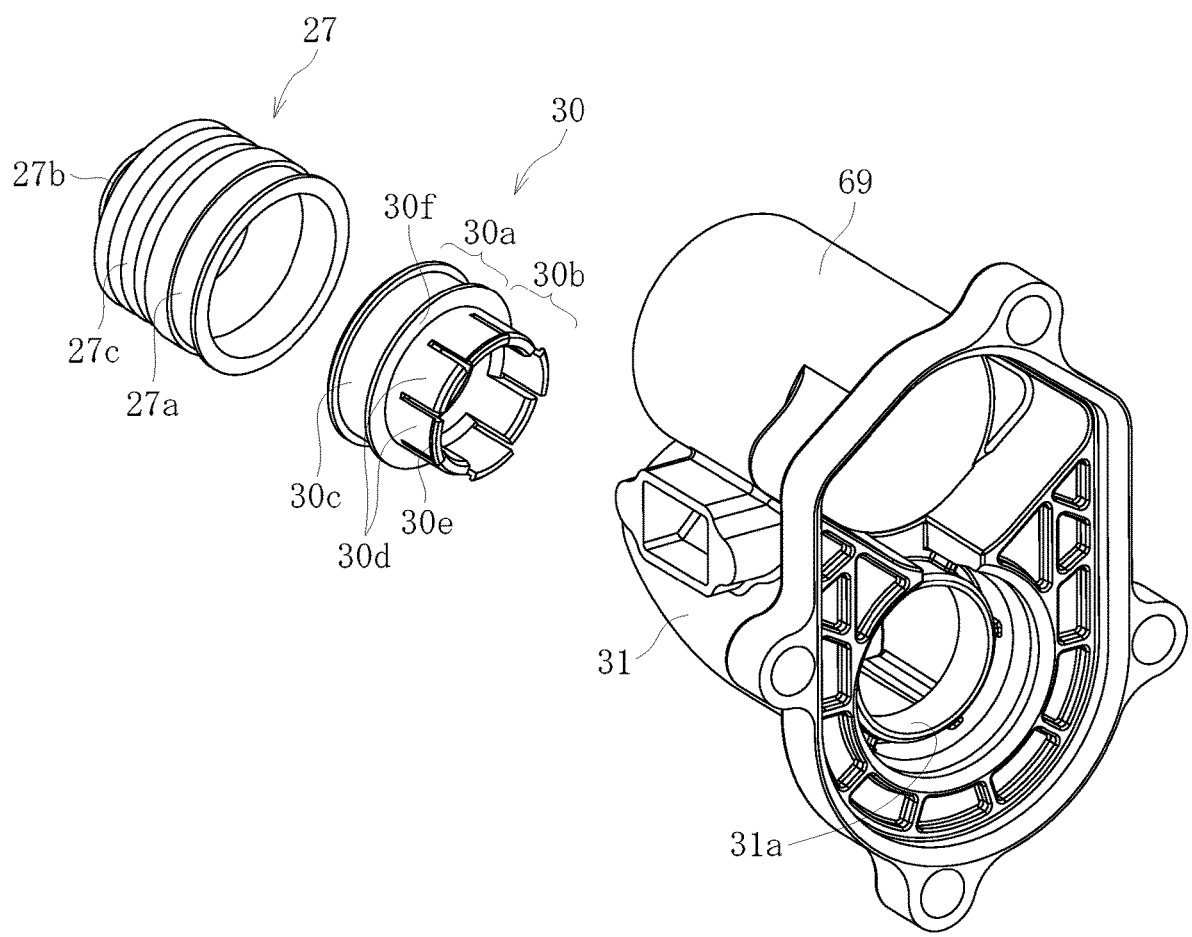
FIG. 7 is a perspective view for illustrating a state in which a boot cover, a boot mounting member, and the boot are separated from one another.

FIG. 6 is a sectional view for illustrating a mounting portion of the boot 27. FIG. 7 is a perspective view for illustrating a state (state before the assembly) in which the boot cover 31, the boot mounting member 30, and the boot 27 are separated from one another.

As illustrated in FIG. 6, the boot mounting member 30 comprises a mounting part 30a and a mounted part 30b. The mounting part 30a receives the boot 27 to be mounted thereto. The mounted part 30b is mounted to the mounting part 31a of the boot cover 31. The mounting part 30a has a groove 30c extending in a circumferential direction. The large-diameter end portion 27a of the boot 27 is fitted to the groove 30c, and is fixed through tightening with a boot band 29. The mounted part 30b has a plurality of slits extending in the axial direction. The plurality of slits are formed at equal intervals in the circumferential direction, thereby forming a plurality of engagement pieces 30d which are elastically deformable in a radial direction (see FIG. 7). An engagement claw 30e is provided at a distal end portion of each of the engagement pieces 30d. Moreover, the mounted part 30b is formed so as to have an outer diameter smaller than that of the mounting part 30a. Therefore, a step part 30f is formed on an outer peripheral surface at a boundary between the mounting part 30a and the mounted part 30b.

The mounting part 31a of the boot cover 31 is a cylindrical portion provided on an inner peripheral surface of the boot cover 31. A rising part 31b rising radially inward is provided on the inner peripheral surface of the boot cover 31. The mounting part 31a is provided so as to extend in the axial direction from the rising part 31b toward a side of a rear end portion (right side of FIG. 6) of the ball screw shaft 22. Moreover, an inclined surface 31c is formed at a location at which the mounting part 31a and the rising part 31b are connected with each other. This inclined surface 31c functions as a guide surface configured to guide a distal end portion of the boot mounting member 30 in a mounting direction when the boot mounting member 30 is mounted to the mounting member 31a, and also plays a role of securing a space for interposing an O-ring 50 serving as a seal member in a gap to the boot mounting member 30.

In order to mount the boot 27 in the boot cover 31, first, the large-diameter end portion 27a of the boot 27 is fitted in the groove 30c of the boot mounting member 30, and is then fixed to the boot mounting member 30 through tightening of the large-diameter end portion 27a with the boot band 29. Then, the O-ring 50 is mounted to the step part 30f of the boot mounting member 30, and the boot mounting member 30 having the O-ring 50 and the boot 27 mounted thereto is inserted into the boot cover 31. When the boot mounting member 30 is inserted into the boot cover 31, the mounted part 30b of the boot mounting member 30 is inserted into the mounting part 31a of the boot cover 31. On this occasion, each of the engagement pieces 30d of the mounted part 30b comes in contact with an inner peripheral surface of the mounting part 31a, and thus elastically deforms radially inward. When the distal end portion of each of the engagement pieces 30d passes the mounting part 31a, each of the engagement pieces 30d elastically returns radially outward. As a result, the engagement claws 30e engage with an end portion of the mounting part 31a, and the boot mounting member 30 is thus mounted to the mounting member 31a so as not to be removed therefrom. Moreover, on this occasion, the step part 30f of the boot mounting member 30 comes in abutment against the rising part 31b, and the O-ring 50 is sandwiched between the boot mounting member 30 and the mounting part 31a, thereby sealing the gap therebetween.

The mounting of the boot 27 to the boot cover 31 is completed as described above. Moreover, the boot 27 is mounted to the ball screw shaft 22 in the following manner. When the boot cover 31 having the boot 27 mounted thereto is assembled to the actuator case 9, the ball screw shaft 22 assembled to the actuator case 9 inserted through the boot 27, and then the small-diameter end portion 27b of the boot 27 is fixed to a side of a distal end portion of the inserted ball screw shaft 22 through tightening with a boot band 28.

As described above, with the configuration of the electric actuator 1 according to this embodiment, the boot mounting member 30 having the boot 27 to be mounted thereto is formed independently of the motor case 8 (motor case main body 69). Thus, even when the boot cover 31 is formed integrally with the motor case 8, the boot 27 can easily be mounted. That is, the boot mounting member 30 can be mounted in the boot cover 31 after the boot 27 is mounted to the boot mounting member 30, and hence the mounting operation for the boot 27 does not need to be performed in a narrow work space in the boot cover 31, thereby being capable of easily mounting the boot 27. Further, this embodiment has a so-called snap-fit mounting structure that elastically deforms the mounted part 30b of the boot mounting member 30 for the mounting. Thus, the boot mounting member 30 can easily be mounted to the boot cover 31 by only inserting the boot mounting member 30 into the boot cover 31 in the axial direction.

Moreover, with the configuration of the electric actuator 1 according to this embodiment, the space required for the mounting operation for the boot 27 does not need to be secured in the boot cover 31. That is, a space for inserting the large-diameter end portion 27a of the boot 27, the boot band 29, and the like does not need to be secured between the outer peripheral surface of the boot mounting member 30 and the inner peripheral surface of the boot cover 31. Therefore, as illustrated in FIG. 6, a gap D between the outer peripheral surface of the boot mounting member 30 and the inner peripheral surface of the boot cover 31 can be smaller than a thickness T of a distal end portion of the large-diameter end portion 27a of the boot 27. In such a manner, with the configuration of the electric actuator 1 of this embodiment, an outer diameter of the boot cover 31 can be reduced, thereby being capable of achieving downsizing of the electric actuator 1 in the radial direction.

Moreover, with the configuration of the electric actuator 1 according to this embodiment, the number of molds configured to form large components can be reduced by forming the boot cover 31 and the motor case 8 (motor case main body 69) integrally with each other, thereby being capable of achieving cost reduction. Meanwhile, the boot cover mounting member 30 is independent of the boot cover 31 and the motor case 8. Thus, injection molding of these members is thus promoted. That is, the boot mounting member 30 has the groove 30c configured to mount the boot 27, and hence, when the motor case 8 and the boot mounting member 30 are to be molded integrally with each other, there arises such a problem that molds cannot be released in the axial direction. However, this problem can be solved by forming the boot mounting member 30 independently, and the injection molding is thus promoted.

Moreover, the boot 27 may be integrally joined to the boot mounting member 30. For example, the boot 27 can be integrally joined to the boot mounting member 30 through vulcanization adhesion of the rubber boot 27, which is independently manufactured, to the resin boot mounting member 30 formed in advance though injection molding. In this case, the boot band 29 configured to mount the boot 27 to the boot mounting member 30 is no longer required. Therefore, the number of components decreases, thereby being capable of achieving cost reduction.

Figure 8:
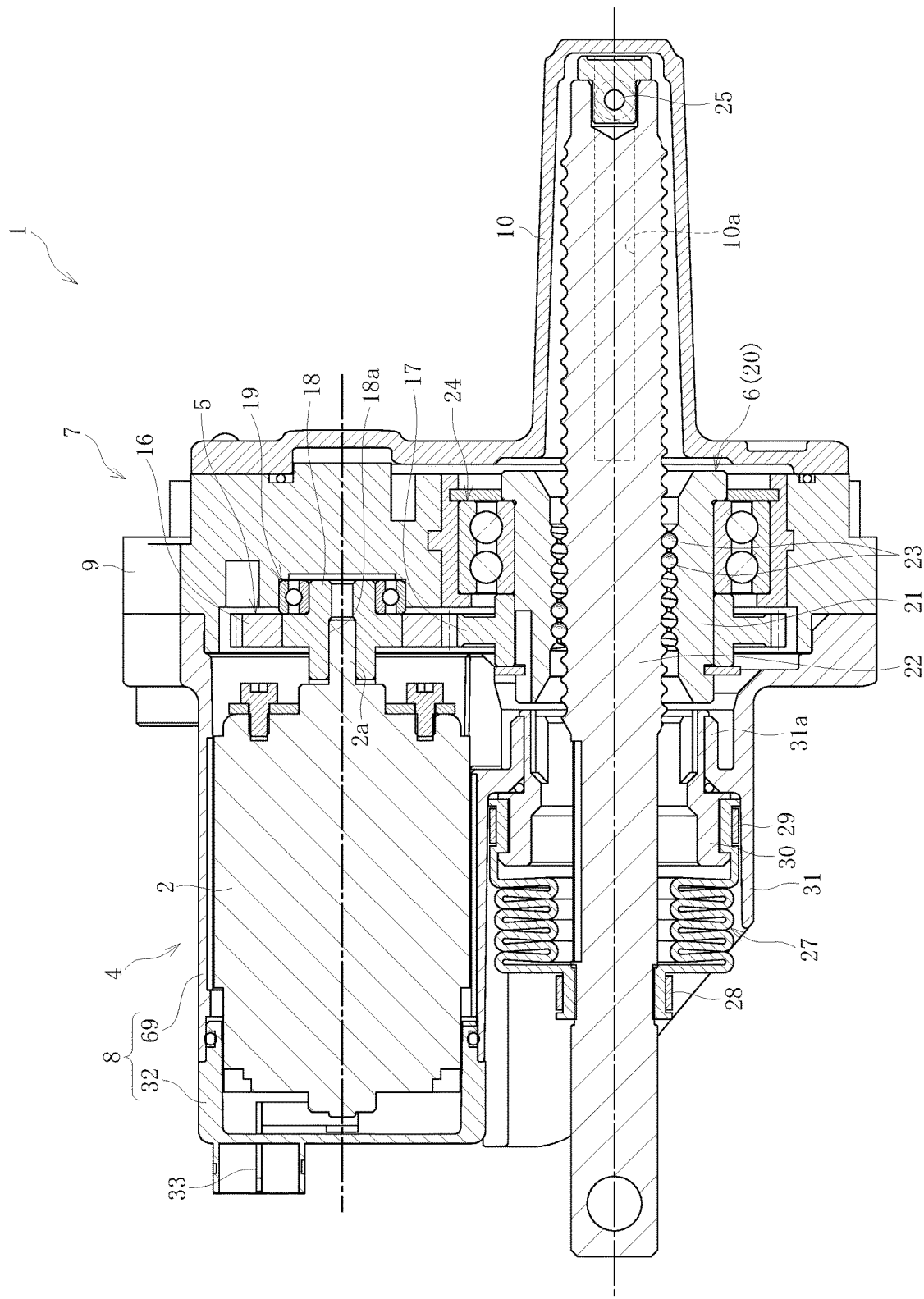
FIG. 8 is a vertical sectional view of the electric actuator according to another embodiment of the present invention.
Figure 9:
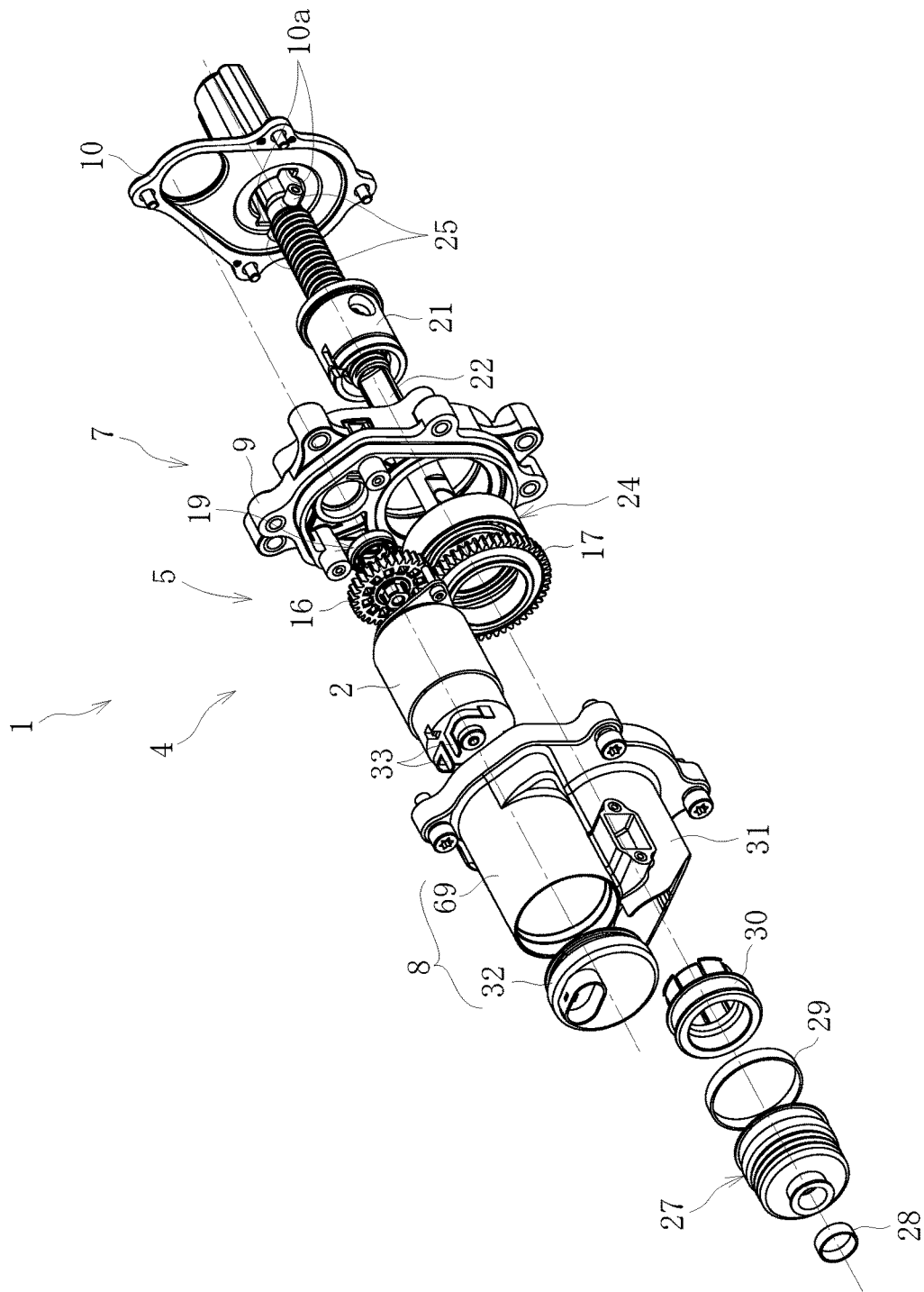
FIG. 9 is an exploded perspective view of the electric actuator according to the another embodiment.

FIG. 8 is a vertical sectional view of the electric actuator according to another embodiment of the present invention. FIG. 9 is an exploded perspective view of the electric actuator according to the another embodiment.

The electric actuator illustrated in FIG. 8 and FIG. 9 does not comprise the planetary-gear speed reduction mechanism 11 and the lock mechanism 26 provided for the electric actuator illustrated in FIG. 1 to FIG. 7. Therefore, the length of the motor case 8 (motor-case main body 69) is reduced a little in the axial direction, and the shaft case 10 has a shape without a portion configured to accommodate the lock mechanism 26. Moreover, in this case, the output shaft 2a of the driving motor 2 is coupled through press-fit to the shaft hole 18a of the gear boss 18, the driving force of the driving motor 2 is directly transmitted to the drive gear 16 (without intermediation of the planetary-gear speed reduction mechanism 11), and is transmitted from the drive gear 16 to the ball screw 20 through the driven gear 17.

In such a manner, the electric actuator adapted to other applications and specifications can be formed by only omitting the planetary-gear speed reduction mechanism 11 and the lock mechanism 26 and replacing the motor case 8 (motor-case main body 69) and the shaft case 10 with other cases, without changing many common parts. Thus, with the configuration of the electric actuator according to this embodiment, an electric actuator which is low in cost and excellent in versatility can be provided also for deployment as multiple types to an electric parking brake mechanism for vehicles including two-wheeled vehicles, an electric/hydraulic brake mechanism, an electric shift change mechanism, and an electric power steering as well as a 2WD/4WD electric switching mechanism and an electric shift change mechanism for an outboard engine (for a vessel propulsion engine), and the like.

The electric actuator according to the another embodiment is configured as in the embodiment illustrated in FIG. 1 to FIG. 7 in points other than those described above. Thus, also in the electric actuator according to the another embodiment, as in the embodiment illustrated in FIG. 1 to FIG. 7, the boot cover 31 is formed integrally with the motor case 8 (motor case main body 69), but the boot mounting member 30 is mountable to the inner side of the boot cover 31. Thus, the boot 27 can easily be mounted. Moreover, as a result, the outer diameter of the boot 31 can be reduced, and the downsizing of the electric actuator 1 in the radial direction can also be achieved.

Description is made of the embodiments of the present invention. However, the present invention is not limited to the above-mentioned embodiments. As a matter of course, the present invention may be carried out in various modes without departing from the spirit of the present invention. In the above-mentioned embodiments, the cases in which the present invention is applied to the electric actuators configured to convert the rotary motion of the driving motor to the linear motion in the axial direction parallel with the output shaft of the driving motor are exemplified, but the present invention is not limited to this type of the electric actuators, and can be applied also to an electric actuator configured to convert the rotary motion of the driving motor to a linear motion coaxial with the output shaft of the driving motor.

REFERENCE SIGNS LIST 1 electric actuator
2 driving motor
2a output shaft
3 speed reduction mechanism
5 transmission gear mechanism
6 motion conversion mechanism
8 motor case
9 actuator case
20 ball screw
27 boot
30 boot mounting member
31 boot cover

The invention claimed is:

1. An electric actuator, comprising:
a driving motor;
a motion conversion mechanism configured to convert a rotary motion of the driving motor to a linear motion;
a boot configured to prevent entry of a foreign substance into the motion conversion mechanism; and
a boot cover configured to cover an outer side of the boot,
wherein the boot cover is formed integrally with an exterior case of the electric actuator,
wherein a boot mounting member having the boot mounted thereto is mounted to an inner side of the boot cover so as not to move linearly due to the rotary motion of the driving motor, and
wherein the boot mounting member comprises an engagement claw configured to elastically deform in a radial direction to engage with the boot cover when the engagement claw is inserted into the boot cover in an axial direction.

2. The electric actuator according to claim 1,
wherein the motion conversion mechanism comprises a ball screw arranged on an axis parallel with an output shaft of the driving motor, and
wherein the electric actuator further comprises a transmission gear mechanism configured to transmit a driving force from the driving motor to the ball screw.

3. The electric actuator according to claim 2,
wherein the exterior case comprises:
a motor case configured to accommodate the driving motor; and
an actuator case configured to support the transmission gear mechanism and the ball screw, and
wherein the boot cover is formed integrally with the motor case.

4. The electric actuator according to claim 1, wherein the boot is integrally joined to the boot mounting member.

5. The electric actuator according to claim 1, wherein the boot mounting member is in direct contact with the inner side of the boot cover.

* * * * *